(12) United States Patent
Barrett et al.

(10) Patent No.: US 9,781,546 B2
(45) Date of Patent: Oct. 3, 2017

(54) SERVER INFORMATION HANDLING SYSTEM WIRELESS MANAGEMENT AND TOPOLOGY

(71) Applicant: Dell Products L.P., Round Rock, TX (US)

(72) Inventors: Robert Barrett, Round Rock, TX (US); Saurav Shrestha, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 192 days.

(21) Appl. No.: 14/755,325

(22) Filed: Jun. 30, 2015

(65) Prior Publication Data

US 2017/0006410 A1  Jan. 5, 2017

(51) Int. Cl.
| | | |
|---|---|---|
| *G01R 31/08* | (2006.01) | |
| *H04W 4/00* | (2009.01) | |
| *H04L 29/06* | (2006.01) | |
| *H04L 12/24* | (2006.01) | |
| *H04W 4/02* | (2009.01) | |
| *H04W 88/06* | (2009.01) | |

(52) U.S. Cl.
CPC ............ *H04W 4/008* (2013.01); *H04L 41/08* (2013.01); *H04L 69/18* (2013.01); *H04W 4/023* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2009/0052467 | A1* | 2/2009 | Kaidar | H04W 12/08 370/469 |
| 2014/0237568 | A1* | 8/2014 | Sista | H04L 63/0876 726/6 |
| 2015/0271737 | A1* | 9/2015 | Shin | H04W 4/008 455/41.2 |
| 2015/0356285 | A1* | 12/2015 | Glaser | G06F 21/32 726/7 |
| 2016/0044504 | A1* | 2/2016 | Edge | H04L 63/10 455/456.3 |
| 2016/0255459 | A1* | 9/2016 | Sarkar | H04W 4/008 455/41.1 |
| 2017/0006576 | A1* | 1/2017 | Barrett | H04W 64/003 |

* cited by examiner

*Primary Examiner* — Phirin Sam
(74) *Attorney, Agent, or Firm* — Terrile, Cannatti, Chambers & Holland, LLP; Robert W. Holland

(57) ABSTRACT

A datacenter server information handling system topology is determined from Bluetooth Low Energy beacon signals communicated with a mobile information handling system that provides multiple ranges temporally related as the mobile information handling system moves through the datacenter. Server information handling system positions are determined and mapped relative to each other and also relative to position information detected in the datacenter, such as with a camera or accelerometer disposed in the mobile information handling system.

12 Claims, 8 Drawing Sheets under user permission provide management access to selected server information handling systems in the datacenter through the mobile information handling system without the need for direct physical interactions, such as through a bezel interface or hardware cable.

SERVER INFORMATION HANDLING SYSTEM WIRELESS MANAGEMENT AND TOPOLOGY

BACKGROUND OF THE INVENTION

Field of the Invention

The present invention relates in general to the field of server information handling system management, and more particularly to server information handling system wireless management and topology.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are often deployed in data centers held vertically or horizontally stacked in rack or blade chassis. Data centers typically have specialized environments that provide server information handling systems infrastructure for normal operations, such as specialized cooling systems, power systems, storage systems and network communications systems. In order to reduce operating costs, server information handling systems typically are supported in thin chassis, such as 1 U of height, vertically stacked in racks disposed at cooling airflow intake locations. A large data center will have rows of racks in one or more rooms where each rack has 44 U or more of height so that a large data center may include thousands of server information handling systems.

Generally, managing server information handling systems in a large data center is performed both remotely and with an information technology specialist physically present within the data center. For example, each server information handling system includes a baseboard management controller (BMC) having an "out-of-band" network interface that communicates through a management network with a management administration information handling system so that information technology specialists can remotely power up and down server systems and perform maintenance, such as operating system, application and firmware updates. In addition to supporting management network communications, information technology specialists also may interact directly with the server information handling system BMC through a small touchscreen at the system bezel or with a hardwire interface, such as using KVM (keyboard, video and mouse) device interfaced with a USB connection. Often at initial deployment of a server information handling system in a rack, information technology specialists configure the BMC through the bezel interface before the BMC can interact through the management network. Although remote management through the management network is generally sufficient to handle many server management and maintenance tasks once initial deployment is complete, some task do call for physical interaction with BMCs and server information handling systems. For example, internal components of a server information handling system may need replacement or repair followed by hands-on software configuration.

One difficulty faced by information technology specialists working in a data center is locating a server information handling system of interest, such as a system in need of physical maintenance. Once a server information handling system is installed in a rack and interfaced with a management network, its physical location becomes largely irrelevant until component repair or replacement is needed. Maintaining a precise inventory of server information handling system locations in a large data center often presents a challenge over time as the data center grows, changes infrastructure and replaces installed server systems. In addition, installed systems often have repairs made over time that replace components with new parts, such as cooling fans, power supplies, hard disk drives, network interface cards and other types of hardware or software devices. BMCs have some capability to track component inventory for components under a BMC's management, provided an information technology administrator knows the BMC name and address of a server information handling system that has a component failure, and provided the information technology specialist is able to confirm that an available inventory matches the components in the server system at hand.

Data centers use various techniques to attempt to accurately track server information handling system locations and component inventory. Conventional inventory controls will work if rigorously enforced as server information handling systems move to different positions in a data center or have components replaced. Often data center information technology administrators face time pressure to keep adequate processing resources available so that inventory controls tend to fall to the wayside when system failures arise. Other techniques attempt to track server information handling system positions by using triangulation with radio signals or indications on racks that BMCs can read to provide feedback of a physical location. Reliance on specialized equipment and limited accuracy tend to restrict the usefulness of such inventory techniques.

SUMMARY OF THE INVENTION

Therefore, a need has arisen for a system and method which provides a server information handling system wireless management and physical topology in a data center.

In accordance with the present invention, a system and method are provided which substantially reduce the disadvantages and problems associated with previous methods and systems for server information handling system management and topology in a data center. Wireless personal area networking communications between server information handling systems of a datacenter and mobile information handling systems moved around in the datacenter provide automated generation of datacenter topology maps having the locations of the server information handling systems presented on the mobile information handling system. Secured interactive management sessions restricted based on distance detected between a server information handling system and mobile information handling system automatically transition to indirect communications media outside of a signal transmission distance threshold.

More specifically, a data center supports plural server information handling systems deployed in plural racks distributed in vertically and horizontally spaced positions. The server information handling systems have wireless personal area network beacons that transmit beacon signals having identifier information and a predetermined signal strength, such as Bluetooth Low Energy beacons. A network administrator holding a mobile information handling system, such as a smartphone or tablet, receives the beacon signals and detects a distance of the beacon signals at plural times. A topology module, such as one or more of firmware, software and hardware elements interfaced with a beacon transceiver, analyzes the beacon signal distances at the plural times to triangulate server information handling system positions relative to each other, thus creating a topology map of the server information handling systems in the data center. The mobile information handling system further determines server information handling system positions in the data center relative to fixed locations detected with locations sensors, such as a camera that captures images of location markings and/or an accelerometer that measures position changes as the mobile information handling system moves. In one embodiment, wireless personal area networking receivers deployed in the server information handling systems receive a beacon from the mobile information handling system to detect distances that are time-stamped and communicated to a topology module through a datacenter management network. Restricting server information handling system wireless personal area networking devices to a beacon-only or receive-only mode reduces security risks associated with wireless communications in the data center by preventing interactions or responses by the server information handling system to unauthorized WPAN queries. In another embodiment, a security module at each server information handling system permits wireless personal area network interactive sessions with mobile information handling systems for distances of less than a threshold. An interface selector automatically transitions such direct interactive sessions to indirect communications media if the distance threshold is exceeded, such as by transitioning to a wireless local area network or a wireless wide area network interface that communicates through a hard-wired management network.

The present invention provides a number of important technical advantages. One example of an important technical advantage is that information technology administrators maintain accurate and up-to-date server information handling system datacenter topology and inventory information by moving through a datacenter with a mobile information handling system wireless personal area network device activated. Position information triangulated from wireless personal area network signals are automatically and continuously updated and provided to a centralized management location to maintain and verify datacenter inventory. A centralized management administration tool interfaced with server information handling systems through a hardwired management network controls wireless personal area beacons to identify specific server information handling systems or advertise desired parameters with the beacon, such as maintenance codes, component identifiers or operating parameters including temperatures, storage capacity, processor utilization and network interface status. An administrator with a topology map generated by beacon signals displayed at a mobile information handling systems is guided to the physical location of server information handling systems of interest. Further, secure interactive sessions with the mobile information handling system are supported within a limited distance defined by the server information handling system and determined with wireless personal area network signal strength.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Server information handling system topology in a datacenter is detected with wireless personal area network beacon communications to a mobile information handling system for improved datacenter inventory, management and maintenance. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
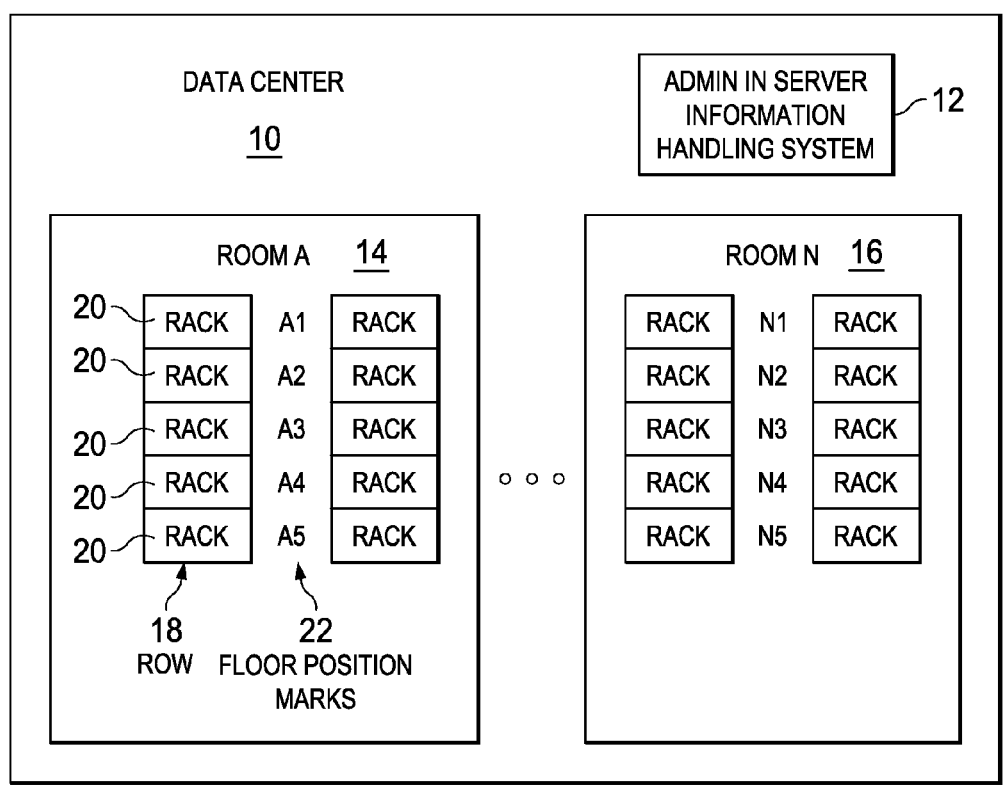
FIG. 1 depicts a top view of a datacenter having plural information handling systems and markings to aid automated topology mapping.

Referring now to FIG. 1, a top view depicts a datacenter 10 having plural information handling systems 26 and markings 22 and 28 to aid automated topology mapping. Data center 10 has one or plural rooms 14 and 16 that each have one or more rows 18 or racks 20 that each support one or more server information handling systems 26. One or more administrative information handling systems 12 interact with rack 20 chassis manager controllers (CMCs) and server information handling systems 26 baseboard management controllers (BMCs) to manage, monitor and maintain server information handling systems 26 in an operational state. For example, data center 10 may have limited power and cooling resources relative to processing demands. Administrative information handling system 12 includes tools that communicate through a management network with CMCs and BMCs to allocate power, cooling and processing priority to server information handling systems 26. In addition, administrative server information handling system 12 includes tools to allow remote power up and power down of server information handling systems 26 through the management network, and maintenance that might include remote loading and removing of software applications, remote virtual machine control, remote operating system patch implementations, and remote firmware updates such as option ROM and driver updates for components. As is depicted in FIG. 1, data centers 10 often include various identification features associated with positions in the one or more rooms 14 and 16. In the example embodiment, floor position markers 22 are placed between rows 18 to identify room and row positions, such as positions A1-A5 in room 14 and N1-N5 in room 16. Floor position marks 22 are aligned so that a camera in a mobile information handling system will capture images of the marks 22 if an information technology administrator is walking between rows 18 and viewing a display of the mobile information handling system, such as a tablet or smartphone information handling system.

Figure 2:
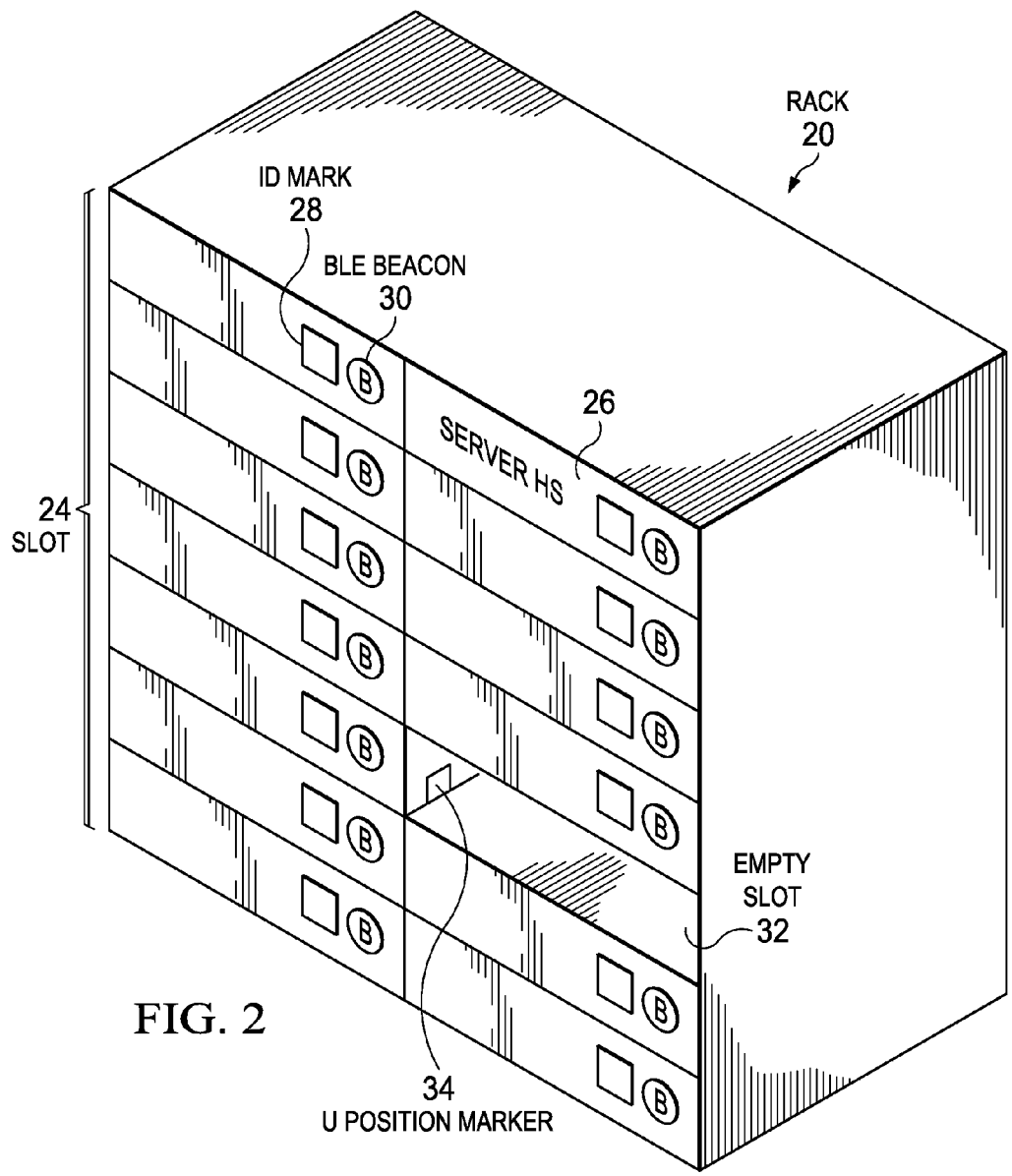
FIG. 2 depicts a side view of information handling system servers deployed in datacenter racks.

Referring now to FIG. 2, a side view depicts information handling system servers 26 deployed in datacenter racks 20. In the example embodiment, racks 20 have vertically stack slots 24 that each accept a server information handling system 26 of adaptable U height. Server information handling systems 26 include each have an identifier mark 28, such as a QR code readable with a camera, and a wireless personal area network beacon device 30, such as a Bluetooth Low Energy beacon. In various embodiments, other types of identifying features may be included, such as a U position marker 34 shown in an empty slot 32 that includes identifier information readable by a BMC. Large data centers 10 may include thousands of server information handling systems deployed in various manners as that depicted by FIG. 2, including vertically stacked racks, blade chassis or other specialized support systems. Information technology administrators interact with identifier information in order to manage the datacenter inventory of server information handling systems 26. Generally, once a server information handling system 26 is tied to a physical location by an identifier, an information technology administrator can access inventory information related to the server information handling system by interacting with its BMC through the management network. Wireless personal area network beacon 30 aids the administrator in identifying a particular server information handling system as is set forth below. Although FIG. 2 depicts a Bluetooth Low Energy beacon 30, in other alternative embodiments, other types of wireless communication protocols may be used, such as 60 GHz short range beacon signals. Also, other types of protocols may be used, such as wireless local area network protocols.

Figure 3:
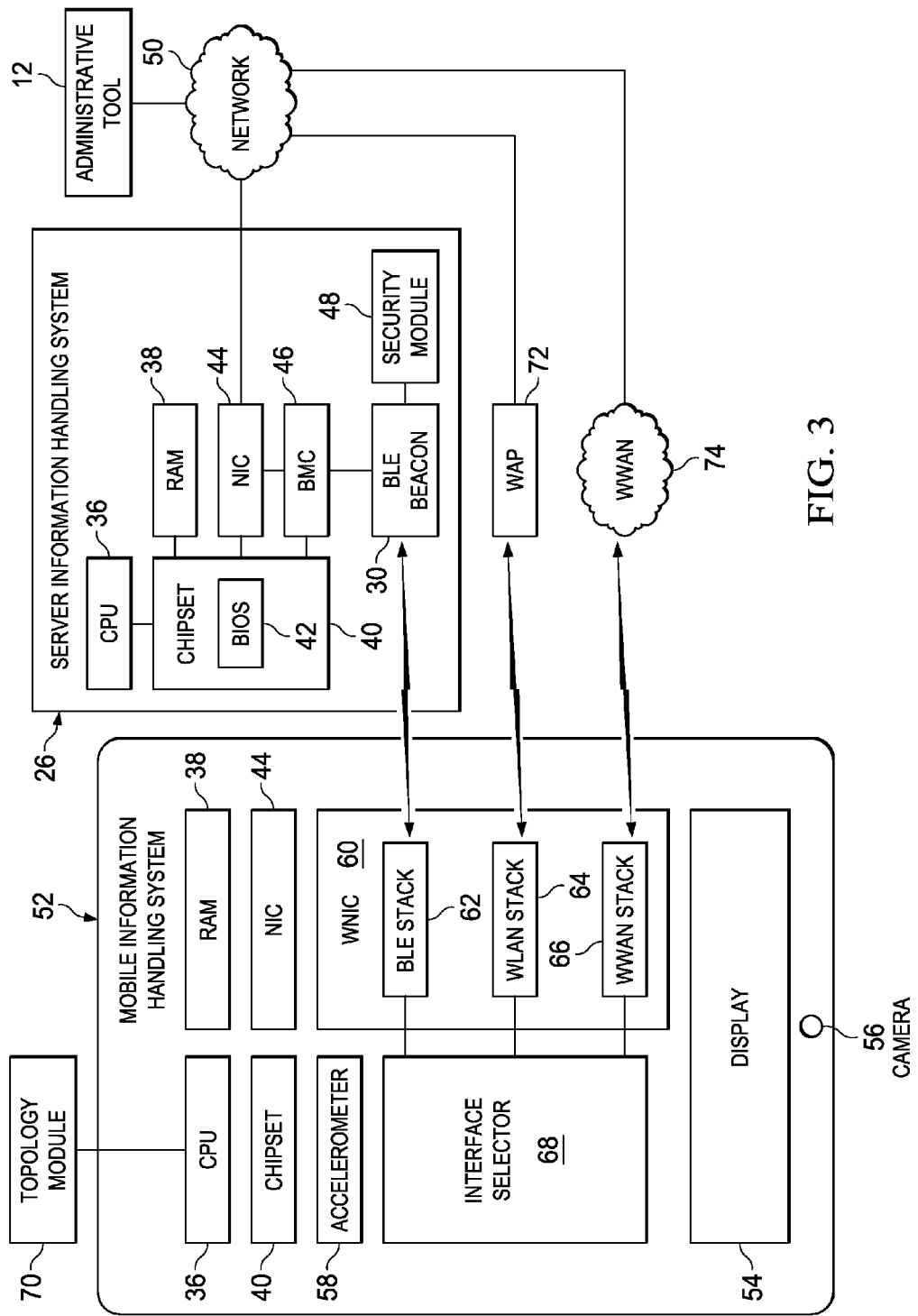
FIG. 3 depicts a block diagram of a system for topology mapping of server information handling systems in a datacenter.

Referring now to FIG. 3, a block diagram depicts a system for topology mapping of server information handling systems 26 in a datacenter 10. Server information handling system 26 processes client requests with one or more central processing units (CPUs) 36 that executes instructions stored in random access memory (RAM) 38. A chipset 40 includes controllers and flash memory that execute and store firmware to coordinate processing functions, such as a basic input/output system (BIOS) 42. For example, chipset 40 coordinates communication with external devices through one or more network interface cards (NICs) 44 that interface with a network 50. A baseboard management controller 46 provides management control of server information handling system 26, such as remote power-up, power-down, software updates, operating system patches and firmware updates. For example, BMC 46 interfaces through a management network 50 with administrative tool 12 to accept management commands from remotely-located administrators. BMC 46 generally also accepts local inputs at a bezel, such as with a small touchscreen device or a keyboard/video/mouse device that plugs into a physical connector, such as a USB connector located on the bezel. In addition, BMC 46 interfaces with a Bluetooth Low Energy (BLE) beacon 30 or other type of wireless personal area networking (WPAN) device that supports one-way or two-way communications with an external mobile information handling system 52. A security module 48 interfaced with BLE beacon 30 enforces security settings that restrict communications by BLE beacon 30. For example, security module 48 prohibits two-way communications by BLE beacon 30 if the range to an external mobile information handling system 52 exceeds a threshold range. In other embodiments, security module 48 applies restrictions that prevent transitions from the beacon mode or that prevent transmissions by restricting BLE beacon 30 to a receive-only mode.

Mobile information handling system 52 processes information in a portable housing with a CPU 36, RAM 38, chipset 40 and NIC 44 for presentation of information as visual images at an integrated display 54. A camera 56 interfaces with CPU 36 to capture visual images and an accelerometer 58 interfaces with CPU 36 to capture accelerations applied to mobile information handling system 52. A wireless network interface card (WNIC) 60 supports wireless networking communication with a BLE stack 62 that supports wireless personal area networking, a wireless local area network (WLAN) stack 64 to support wireless communications through a wireless access point 72, and a wireless wide area network (WWAN) stack 66 to support wireless communication with a wireless wide area network (WWAN) 74, such as a mobile telephone service provider network. An interface selector 68 interfaces with WNIC 60 to select an appropriate wireless communication protocol as set forth in greater detail below.

A topology module 70 stored in non-transitory memory of mobile information handling system 52 executes to access information provided from BLE stack 62 for mapping the topology of server information handling systems 26 deployed in datacenter 10. For example, topology module 70 is an app that runs on a mobile telephone or tablet information handling systems as part of a datacenter management software suite. Topology module 70 retrieves and stores BLE beacon signals detected by BLE stack 62 along with a range determined from the BLE beacon signals and a time stamp of when the BLE beacon signals are received. Alternatively, topology module 70 commands BLE stack 62 to send a beacon signal for reception by BLE beacons 30 deployed at server information handling systems 26. As mobile information handling system 52 moves through datacenter 10, multiple ranges are detected at multiple time periods for each of plural server information handling systems 26 allowing a determination of the relative locations of the server information handling systems 26 to each other by triangulation. In addition, the relative position of server information handling systems 26 to datacenter reference points are provided by inputs from camera 56 and accelerometer 58 to topology module 70. For example, camera 56 captures images of floor position markers 22 and references the time of the images to determine relative positions of floor position markers 22 to triangulated locations of server information handling systems 26. Once a datacenter position is determined within a datacenter, accelerometer 58 provides acceleration information to topology module 70 to estimate travel by the end user from a known position.

Figure 4:
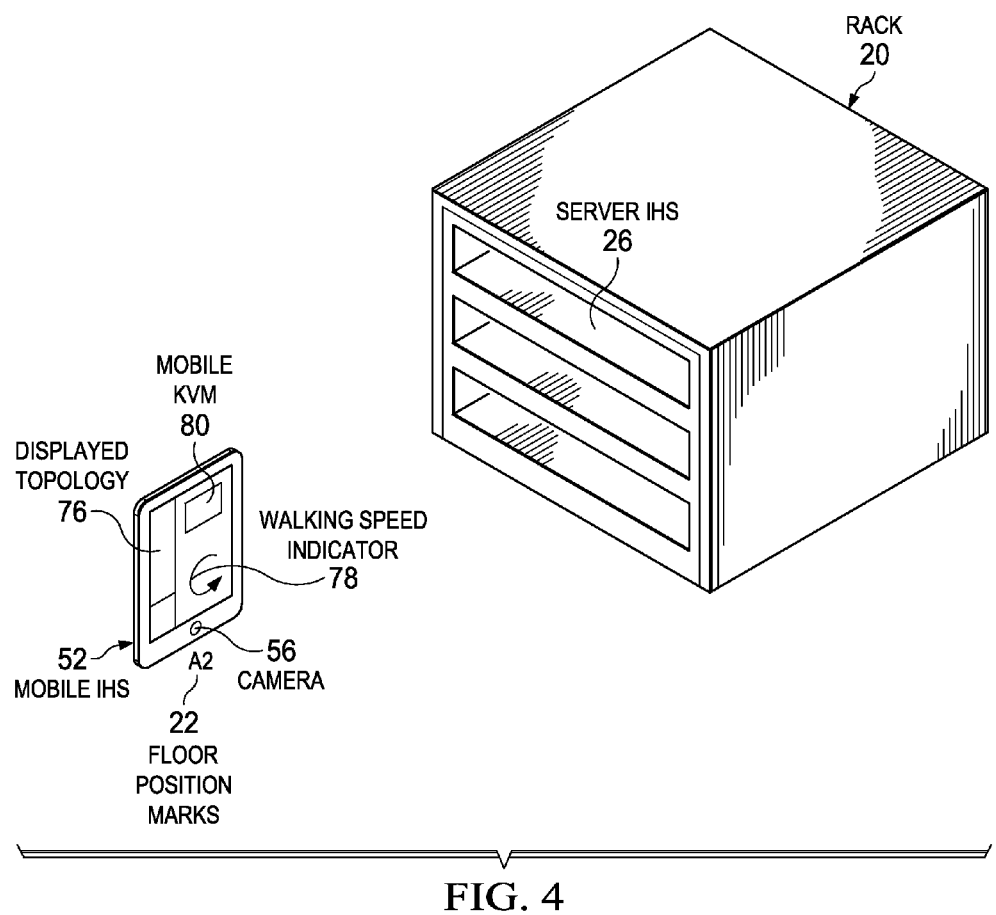
FIG. 4 depicts an upper perspective view of an information technology administrator mapping a datacenter topology.

Referring now to FIG. 4, an upper perspective view depicts an information technology administrator mapping a datacenter topology. The administrator carries a mobile information handling system 52 with camera 56 directed towards floor position marks 22 to capture position information, such as a known position associated with the A2 floor position mark 22. A mobile KVM 52 provides a mouse, video and keyboard user interface to interact with server information handling systems 26 through a WPAN connection. A walking speed indicator 78 presents feedback to the administrator or a direction and speed that the administrator can take to obtain position information from reception of BLE beacon signals. For example, if a displayed topology 76 at mobile information handling system 52 has sufficient range information in one area of a datacenter, walking speed indicator can direct the administrator to another area or at a different walking speed so that topology information is generated in an accurate manner. As range information to BLE beacons is gathered at mobile information handling system 52 and processed to triangulate distances, display topology 76 is updated for the administrator. Although FIG. 4 depicts the administrator intentionally mapping the data center, in another embodiment, the administrator's smartphone or tablet passively gathers position information as the administrator walks through the datacenter. In yet another alternative embodiment, the administrator's smartphone or tablet provides a beacon signal to server information handling systems 26 as the administrator walks through the datacenter so that the server information handling systems forward the position to a centralized tool that determines datacenter topology.

Figure 5:
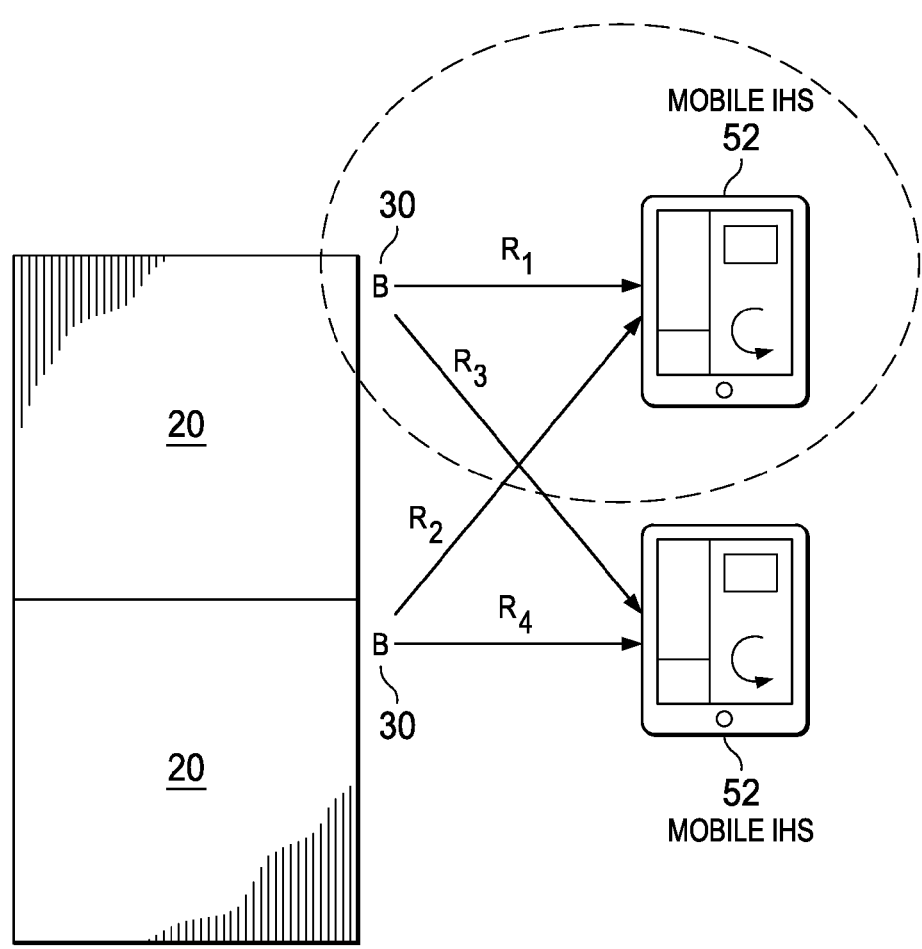
FIG. 5 depicts a top view of the applying of plural ranges detected between server information handling systems and a mobile information handling system to map a datacenter topology.

Referring now to FIG. 5, a top view depicts applying plural ranges detected between server information handling systems 26 and a mobile information handling system 52 to map a datacenter topology. Each WPAN beacon 30 transmits a beacon signal, such as a BLE signal, at a predetermined strength. The beacon signal may be automatically timed at desired intervals or responsive to a ping request from a WPAN device disposed in mobile information handling system 52. Each server information handling system 26 includes a unique identifier with the beacon signal so that mobile information handling system 52 can identify a particular server information handling system 26 with a determined range for each beacon signal received from the server information handling system over a time period. By capturing plural ranges as plural time periods with mobile information handling system 52, the relative position of a server information handling system to the mobile information handling system 52 is determined by triangulation. Near simultaneous capture by mobile information handling system 52 of ranges to other server information handling systems at the plural times provides a basis for establishing triangulated relative position information between the server information handling systems, whether or not the absolute position of mobile information handling system 52 is known.

In the example embodiment depicted by FIG. 5, mobile information handling system 52 obtains ranges r1 and r2 at a first time to the beacon 30 at first and second server information handling systems 26. As the administrator moves through the datacenter to a second position, mobile information handling system 52 obtains ranges r3 and r4 at a second time to the beacons 30 of the first and second server information handling systems 26. The relative positions of the first and second server information handling systems 26 to each other is established by determining the intersection of the range diameters at the separate server information handling systems 26 for the separate time periods and basing the relative positions on the temporal relationship of the measured ranges. In a situation where plural range measurements to plural server information handling systems exist with a small temporal difference, such as less than a second, an assumption is applied that mobile information handling system 52 was in the same position for the range measurement at each time period. If a greater temporal difference exists, the position of mobile information handling system 52 may be used as a reference point with its position established by a reference point, such as an image of a marker captured by a camera, or by relative motion estimated from accelerometer data.

Figure 6:
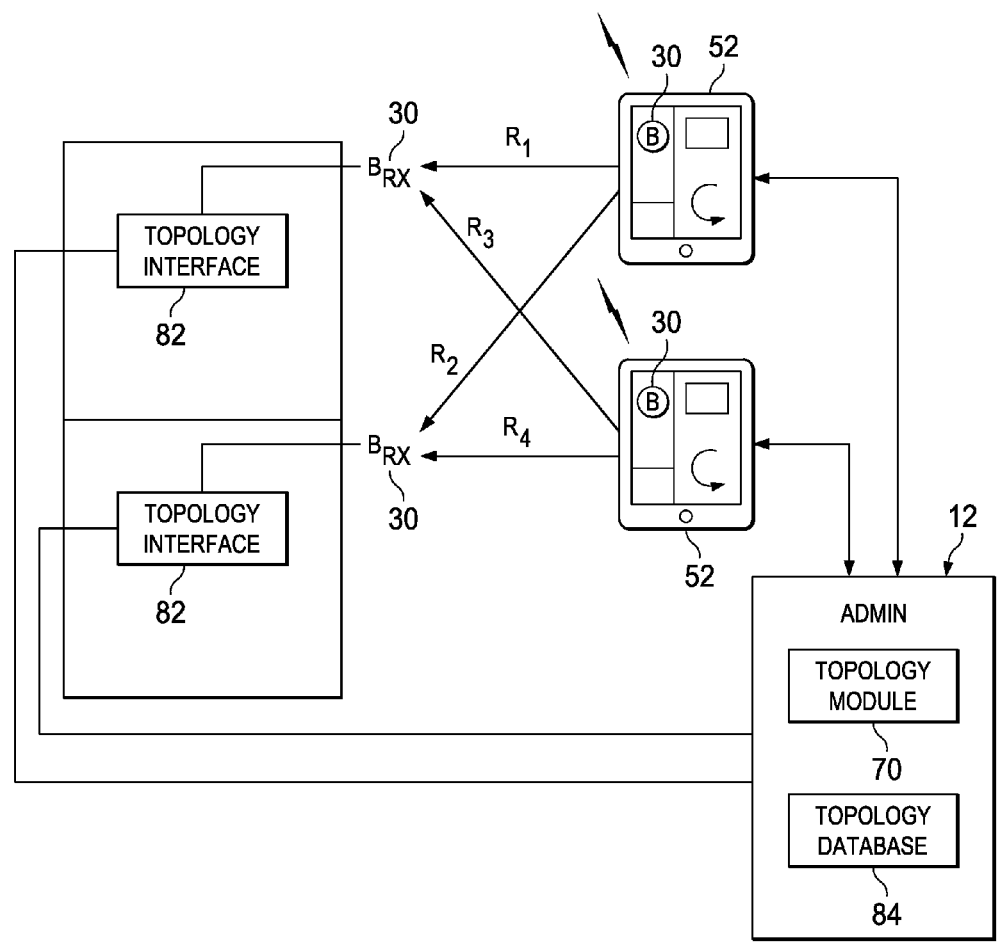
FIG. 6 depict a top view of applying ranges for signals sent from a mobile information handling system to plural server information handling systems to map a datacenter topology.

Referring now to FIG. 6, a top view depicts applying ranges for signals sent from a mobile information handling system 52 to plural server information handling systems 26 to map a datacenter topology. A WPAN device disposed in mobile information handling system 52, such as a BLE beacon 30, transmits a beacon signal with an identifier that is received by a WPAN device at server information handling systems 26. The beacon signal from mobile information handling system 52 has a predetermined strength so that the beacon signal received at server information handling systems 26 provide range information based upon signal strength. A topology interface 82 at each server information handling system 26 determines the range, the beacon identifier, and the time of reception of the beacon signal, and sends the data to administrative tool 12, such as through a management network. A topology module 70 executing on the administrative tool 12 builds a topology database 84 with the range and time data provided from topology interfaces 82. Topology module 70 applies the temporal range data to determine the relative positions of server information handling systems 26 to each other and forwards the resulting topology map to mobile information handling system 52 through a wireless local area network or wireless wide area network. Advantageously, administrators running a WPAN beacon while doing other tasks in the datacenter provide up-to-date mapping of the datacenter with minimal WPAN signals. Further, since the relative position of the administrator to the server information handling systems is constantly updated, the administrative tool 12 may initiate administrator interactions with the end user and a desired server information handling system 26 based upon the proximity of the administrator. In such a situation, a security module of the WPAN beacon 30 of a selected server information handling system is authorized to transmit so that a connection is established with mobile information handling system 52 provided a maximum range threshold is not breached. If the range threshold is breached, then the security module initiates a transition from the WPAN connection to a hardwired connection through a management network that the mobile information handling system 52 interacts with through a WLAN or WWAN interface.

Figure 7:
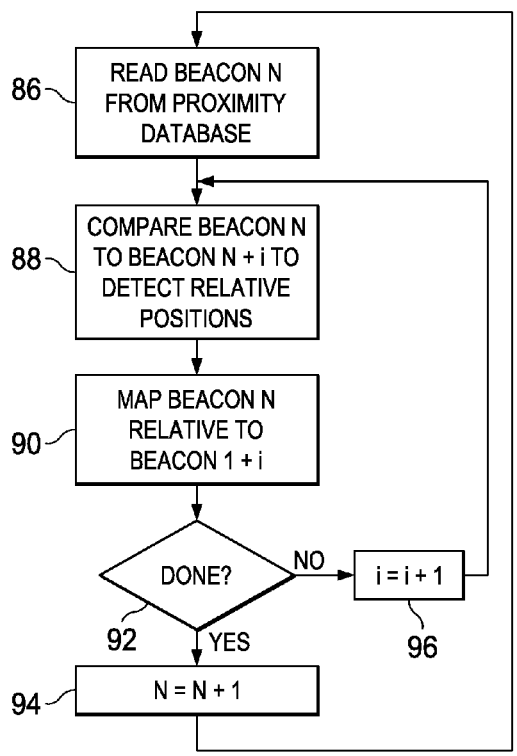
FIG. 7 depicts a flow diagram of a process for reading beacons with a mobile information handling system to map a datacenter topology.

Referring now to FIG. 7, a flow diagram depicts a process for reading beacons with a mobile information handling system 52 to map a datacenter topology. At step 86, the mobile information handling system reads the identifier information from a beacon N established in a proximity database stored on the mobile information handling system. At step 88, the range values for Beacon N are compared with ranges values of beacons detected in the same temporal sample, such as within a one second sample of beacon signals received at mobile information handling system 52. At step 90, the most recent beacon in time (1+i) is selected for comparison to establish a relative position to the beacon N. After establishing the range relationship to the most recent beacon in time, the process continues to step 92 to determine if all temporally-relevant beacons are considered of if additional beacons are available. If additional beacons are available, the process continues to step 96 to increment to the next most recent beacon and returns to step 88 to establish relative positions for the server information handling systems. If at step 92 all temporally-relevant beacons were compared, the process continues to step 94 to increment to the next detected beacon and returns to step 86 to determine the relative positional relationship of the next detected beacon to its temporally-relevant neighbors. As the administrator walks through the datacenter, a continually rotating series of detected beacons eventually builds a positional relationship that accurately tracks relative positions of those beacons that do not have temporally-relevant range relationships.

Figure 8:
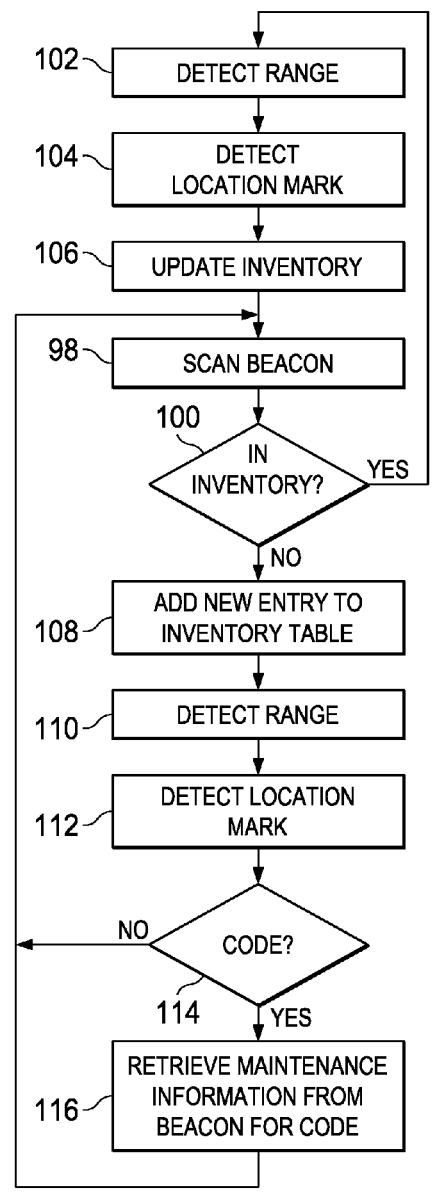
FIG. 8 depicts a flow diagram of a process for tracking plural ranges to plural server information handling systems in a datacenter in support of mapping a datacenter topology.

Referring now to FIG. 8, a flow diagram depicts a process for tracking plural ranges to plural server information handling systems in a datacenter in support of mapping a datacenter topology. The process starts at step 98 with a scan of a beacon by a mobile information handling system in the data center. At step 100 a determination is made of whether the detected beacon is in the database inventory of beacons tracked by the mobile information handling system's topology module, such as by performing a lookup of the beacon identifier in the database. If the beacon identifier is in the inventory, the process continues to step 102 to detect a range for the beacon at a time stamp at which the beacon is detected. At step 104, an attempt is made to detect a location mark associated with the position, such as by capturing an image of a floor marker, so that the beacon identifier position can be placed relative to a definitive position marker disposed within the datacenter. If a location mark is not available, a relative location may be estimated based upon the direction of travel of the mobile information handling system at the time of detection of the beacon or the known location of other beacons as set forth above. At step 106, the server information handling system inventory is updated to add the identifier range and time stamp from the BLE beacon advertisement to the database of server information handling systems kept by the mobile information handling system. The process then returns to step 98 to scan the next beacon.

If at step 100 the scanned beacon identifier is not in the inventory, the process continues to step 108 to add a new entry into the inventory of server information handling systems tracked by the mobile information handling system. At step 110, a range is detected for the beacon and added to the inventory so that position information can be determined at the next temporal range data added to the inventory. At step 112, an attempt is made to detect a location mark for association with the beacon identifier, such as within an image captured by a camera or a distance from a last known position estimated by accelerometer data, and an initial location is entered for the beacon identifier. At step 114, a determination is made of whether the beacon includes a code indicating that the server information handling system requires maintenance, such as initial configuration for a newly installed system. If no maintenance code is detected in the beacon transmission, then the process returns to step 98 to continue scanning for beacons. If a maintenance code is detected at step 114, the process continues to step 116 to retrieve the maintenance code with the mobile information handling system, such as by establishing a connection between the mobile information handling system and server information handling system WPAN. Once maintenance is complete, the process returns to step 98 to continue scanning for beacons.

Figure 9:
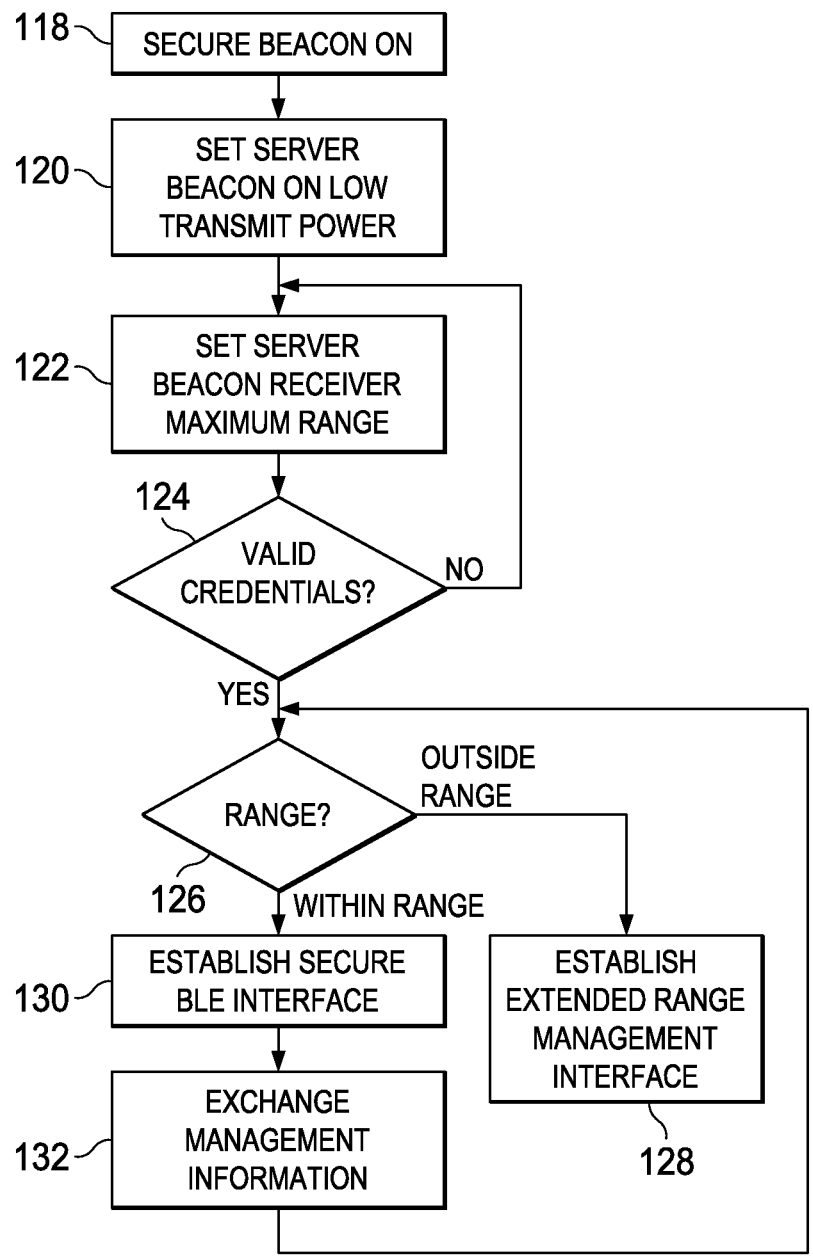
FIG. 9 depicts a flow diagram of a process for secure management of server information handling systems with wireless personal area networking.

Referring now to FIG. 9, a flow diagram depicts a process for secure management of server information handling systems with wireless personal area networking. At step 118, the security module initiates a secure beacon on mode that transmits a BLE beacon advertisement with a unique identifier and any relevant maintenance codes. In the secure beacon mode, the BLE device will transmit only and not respond to any received signals in order to remove the risk of unauthorized access to the BMC through a BLE connection. At step 120, the beacon is set to transmit at a predetermined low power so that mobile information handling systems that receive the beacon signal can determine a range from the beacon signal strength. At step 122, the server beacon is set to receive interactive communications at a maximum range in distance. For example, an administrative tool authorizes two-way communications by a BLE beacon with a message sent through a hard-wired management network when the server information handling system needs maintenance or location. The administrator receives the beacon signal and detects the desired server information handling system with an identifier included in the beacon signal. If the administrator attempts to connect with the beacon outside of the range threshold defined by security settings, the connection request will be refused until the administrator arrives within the range threshold, as is set forth in greater detail below.

At step 124, a determination is made of whether the mobile information handling system provides the server information handling system beacon with valid credentials. If not, the process returns to step 122. If the mobile information handling system provides valid credentials, the process continues to step 126 to determine the range of the mobile information handling system from the server information handling system beacon. If the range exceeds a security threshold, then at step 128 a WPAN interface is refused and an extended range connection is instead established, such as a WLAN or WWAN connection by the mobile information handling system to a hardwired management network interface of the server information handling system BMC. If the range is within the security threshold at step 126, the process continues to step 130 to establish secure a BLE interface connection. By restricting the connection to a maximum range, the risk of unauthorized access is reduced due to the reduced signal strength and the controlled and secure physical environment at the datacenter. At step 132, management information is exchanged through the WPAN connection and the process returns to step 126 to re-validate that the range is within the maximum threshold. If range increases beyond the authorized threshold, the process continues to step 128 to automatically transition from the WPAN connection to a more secure hardwired management network.

Although the present invention has been described in detail, it should be understood that various changes, substitutions and alterations can be made hereto without departing from the spirit and scope of the invention as defined by the appended claims.

What is claimed is:

1. A method for securely communicating with plural server information handling systems in a datacenter, the method comprising:
communicating wireless personal area network signals between the plural server information handling systems and one or more mobile information handling systems to detect a range associated with each of the wireless personal area network signals;
restricting communicating of the personal area network signals from the plural server information handling systems with information that responds to the one or more mobile information handling systems unless the communications have signals within a range threshold; and
supporting interactive management of the plural server information handling systems by the one or more mobile information handling systems using the wireless personal area network signals if the wireless personal area network communications fall within the predetermined range.

2. The method of claim 1 wherein communicating wireless personal area network signals between the plural server information handling systems and one or more mobile information handling systems to detect a range associated with each of the wireless personal area network signals further comprises:
transmitting the wireless personal area network signals from the one or more mobile information handling systems as a beacon received by each of the plural server information handling systems; and
responding to the beacon at each of the server information handling systems only within the threshold range.

3. The method of claim 1 wherein communicating wireless personal area network signals between the plural server information handling systems and one or more mobile information handling systems to detect a range associated with each of the wireless personal area network signals further comprises:
transmitting the wireless personal area network signals from the plural server information handling systems to the one or more mobile information handling systems as beacons received by each of the one or more mobile information handling systems; and
transitioning from the beacon to an interactive session at the plural server information handling systems only if a connection request is received having a signal within the range threshold.

4. The method of claim 1 further comprising:
establishing interactive management with wireless personal area network communications between one of the plural server information handling systems and the mobile information handling system;
detecting range associated with the wireless personal area network that exceeds the threshold; and
in response to detecting, automatically transitioning to indirect communications between the one for the plural server information handling systems and the mobile information handling system.

5. The method of claim 4 wherein the indirect communications comprises a wireless local area network interface by the mobile information handling system with a management network connected by a wired connection with the one of the plural server information handling systems.

6. The method of claim 4 wherein the indirect communications comprises a wireless wide area network interface by the mobile information handling system with a management network connected by a wired connection with the one of the plural server information handling systems.

7. A system for communicating management information in a data center with plural server information handling systems, the system comprising:
a mobile information handling system having a wireless personal area network device operable to communicate wireless personal area network signals;
plural server information handling systems, each server information handling system having a wireless personal area network device operable to communicate wireless personal area network beacon signals; and
a security module integrated with each server information handling system and interfaced with the wireless personal area network device, the security module operable to restrict transition of the beacon into an interactive session with the mobile information handling system based upon a distance detected to the mobile information handling system wireless personal area network signals.

8. The system of claim 7 wherein the wireless personal area network communications comprise a Bluetooth Low Energy beacon transmitting from the server information handling system and the security module detects the distance based upon a predetermined signal from the mobile information handling system.

9. The system of claim 7 further comprising an interface selector interfaced with the security module and operable to transition the interactive session to a non-direct interface if the distance detected for the wireless personal area network exceeds a threshold.

10. The system of claim 9 wherein the non-direct interface comprises a wireless local area network interface to the mobile information handling system and a hardwired management network interface to the server information handling system.

11. The system of claim 9 wherein the non-direct interface comprises a wireless wide area network interface to the mobile information handling system and a hardwired management network interface to the server information handling system.

12. The system of claim 7 further comprising a topology module integrated on the mobile information handling system and operable to present a map having the positions of the plural server information handling systems.

\* \* \* \* \*